(12) United States Patent
Jahnle et al.

(10) Patent No.: US 11,472,078 B2
(45) Date of Patent: Oct. 18, 2022

(54) DURABLY SEALING CONNECTION BETWEEN INSERT AND POLYMER AND PRODUCTION METHOD THEREFOR

(71) Applicant: Robert Bosch GmbH, Stuttgart (DE)

(72) Inventors: Hendrik Jahnle, Leutenbach (DE); Bernd Beiermeister, Steinheim-Kleinbottwar (DE); Markus Menacher, Ingersheim (DE); Norman Lung, Weinstadt (DE); Victor Roman, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 399 days.

(21) Appl. No.: 16/461,651

(22) PCT Filed: Oct. 2, 2017

(86) PCT No.: PCT/EP2017/074945
§ 371 (c)(1),
(2) Date: Oct. 14, 2019

(87) PCT Pub. No.: WO2018/091188
PCT Pub. Date: May 24, 2018

(65) Prior Publication Data
US 2020/0039126 A1 Feb. 6, 2020

(30) Foreign Application Priority Data
Nov. 16, 2016 (DE) ..................... 10 2016 222 534.0

(51) Int. Cl.
*B29C 45/14* (2006.01)
*B33Y 80/00* (2015.01)
*B29C 39/10* (2006.01)

(52) U.S. Cl.
CPC ........ *B29C 45/14311* (2013.01); *B29C 39/10* (2013.01); *B29C 45/14819* (2013.01); *B33Y 80/00* (2014.12); *B29K 2995/0005* (2013.01)

(58) Field of Classification Search
None
See application file for complete search history.

(56) References Cited

U.S. PATENT DOCUMENTS 3,502,531 A * 3/1970 Shockey ................... E06B 3/56
156/293
3,523,994 A * 8/1970 Shockey ................... E06B 3/56
264/252

(Continued)

FOREIGN PATENT DOCUMENTS

AT 11396 10/2010
DE 10313832 10/2004
(Continued)

OTHER PUBLICATIONS

International Search Report for Application No. PCT/EP2017/074945 dated Nov. 23, 2017 (English Translation, 2 pages).

*Primary Examiner* — Edmund H Lee
(74) *Attorney, Agent, or Firm* — Michael Best & Friedrich LLP (57) ABSTRACT

The invention relates to a method (100) for establishing a connection between an inlay (1, 1', 1") and a polymer (3) at least partially surrounding the inlay, wherein a monomer (2) is brought into contact (110) with the inlay (1, 1', 1") and is subsequently polymerized (120) to form the polymer (3), wherein the temperature TE of the inlay (1, 1', 1") is increased (130) at least briefly at least to that temperature TM that the monomer (2) assumes at its maximum during its exothermic polymerization (120) to form the polymer (3), and/or that ensures that the heat flow always runs from the inlay (1, 1', 1") to the monomer (2). The invention also (Continued)

relates to a method (200), (300), (400) for the sealing integration of an inlay (1, 1', 1") in a component (5). The invention also relates to a device (50) for carrying out the method (100), comprising a conveyor (51) for a lead frame (11) in which a multiplicity of inlays (1, 1', 1") are able to be fed, and an at least two-part (52a, 52b) mould (52) which is closable about an individual inlay (1, 1', 1") and has a feed (53) for feeding the monomer (2) into the space (54) between the mould (52) and the inlay (1, 1', 1"), wherein a current supply (55) is provided for the resistive and/or inductive heating (131) of the inlay (1, 1', 1") surrounded by the mould (52).

18 Claims, 11 Drawing Sheets

(56) References Cited

U.S. PATENT DOCUMENTS

| | | | | |
|---|---|---|---|---|
| 3,655,854 | A | * | 4/1972 | Shockey .................. E06B 3/62 264/134 |
| 5,424,250 | A | * | 6/1995 | Sawada .................. H01L 21/56 257/788 |
| 9,527,230 | B2 | * | 12/2016 | Takeuchi ............... B29C 66/524 |
| 2004/0188427 | A1 | | 9/2004 | Huang |
| 2006/0261452 | A1 | | 11/2006 | Berchtold et al. |
| 2007/0020996 | A1 | | 1/2007 | Kuzeja |
| 2013/0272780 | A1 | * | 10/2013 | Takeuchi ............ B29C 65/4815 403/270 |
| 2015/0064409 | A1 | * | 3/2015 | Takeuchi ................ B29C 70/86 428/164 |

FOREIGN PATENT DOCUMENTS

| | | |
|---|---|---|
| DE | 102005033912 | 10/2006 |
| DE | 202006013243 | 10/2006 |
| EP | 0214815 | 3/1987 |
| EP | 1202852 | 5/2002 |
| JP | H09174581 A | 7/1997 |
| JP | H11105076 A | 4/1999 |
| JP | 2004249681 A | 9/2004 |
| JP | 2012101394 A | 5/2012 |
| JP | 2015214137 A | 12/2015 |
| JP | 2016047601 A | 4/2016 |
| WO | 9108958 | 6/1991 |

* cited by examiner

DURABLY SEALING CONNECTION BETWEEN INSERT AND POLYMER AND PRODUCTION METHOD THEREFOR

BACKGROUND OF THE INVENTION

The present invention relates to methods for the durably sealing connection of an inlay, which is metallic in particular, to a polymer enclosing this inlay, in particular for electrical feedthroughs through plastic housings.

Electronic components, such as conductor tracks, sensors, and printed circuit boards, are often embedded in plastic carriers or housed in plastic housings. In order that the components can fulfill the function thereof, an electrical feedthrough of a metallic line through the carrier or the housing, respectively, is required.

The problem results in principle in this case that metal and plastic have different rates of shrinkage. In the event of temperature changes in operation, or also already during the extrusion coating of the metal with hot plastic and subsequent cooling of the plastic, the plastic can detach from the metal. The resulting gaps impair the sealing action of the carrier or housing, respectively, so that, for example, water can penetrate and disable the electronic components due to short-circuiting.

Various approaches are known for remedying this problem. By attaching additional seals, as known, for example, from DE 20 2006 013 243 U1, the design can be modified so that gaps can be tolerated. For example, elastomers can be injected on, which always enclose the metal leak-tight like an O-ring. DE 103 13 832 A1 discloses sealing gaps using hot-melt adhesives. DE 10 2005 033 912 B3 discloses improving the bond between metal and plastic by microlaser structuring and by galvanic processes. EP 1 202 852 B1 discloses forming the metal so that it is constrained by the plastic in the event of temperature changes and seals the gap in at least one section.

SUMMARY OF THE INVENTION

A method for producing a connection between an inlay and a polymer at least partially enclosing the inlay was developed in the scope of the invention. In this case, a monomer is brought into contact with the inlay and is subsequently polymerized to form the polymer.

The monomer can be provided for this purpose in particular as a mixture having a catalyst and/or an activator, which start and/or maintain the polymerization. The monomer can also be single-component, however. A catalyst and/or an activator can be chemically bound in the monomer, for example, and released upon exceeding the temperature required for the polymerization. Since the composition of the monomer is not the subject matter of the invention, reference is only made hereafter to the "monomer".

The monomer can be in particular caprolactam, which polymerizes to form polyamide-6 (PA6).

According to the invention, the temperature $T_E$ of the inlay is at least temporarily increased at least to the temperature $T_M$ which the monomer assumes at most during its exothermic polymerization to form the polymer and/or which ensures that the heat flow always runs from the inlay to the monomer.

It has been recognized that it is decisive for optimum adhesion of the polymer to the inlay that the monomer is completely converted to form the polymer, i.e., is polymerized, especially at the contact surface in relation to the inlay. Two effects at this contact surface can interfere with the polymerization:

On the one hand, monomer, activator, or catalyst can interact with the material of the inlay, whereby the polymerization is either prevented, slowed, or terminated excessively early. This can either take place due to the deactivation of active chain ends during the polymerization or due to the deactivation of activator or catalyst during or before the polymerization. The deactivation typically results due to a redox reaction between inlay and monomer, activator, or catalyst (in particular in the case of metals) or due to free protons, which deactivate the reaction, also called "quenching" in technical circles.

On the other hand, energy can be withdrawn from the polymerization due to the thermal conductivity of the inlay.

Because of the redox potentials of metals in conjunction with a high thermal conductivity, it was heretofore only possible with great effort to completely anionically polymerize a monomer which was in contact with a metal having free ions.

It has been recognized that the temperature increase of the inlay surprisingly counteracts both interfering factors simultaneously. In particular the increase at least to $T_M$ ensures that a possible heat flow between inlay and monomer always runs from the inlay to the monomer, i.e., only supplies energy to the polymerization and does not withdraw it. This energy supply in turn causes the affinity of the monomer molecules for bonding to one another to be enhanced. For a given monomer molecule, the probability that it bonds to another monomer molecule is thus advantageously increased in relation to the probability that it undesirably interacts with an ion of the inlay. As a result, the monomer completely polymerizes through and adheres particularly well to the inlay. The shear force acting in the event of a different rate of shrinkage of inlay and polymer on the contact surface between inlay and polymer is thus transferred to the volume of the polymer and distributed therein, so that a gap formation does not occur between inlay and polymer.

The temperature of the inlay can be increased, for example, after the inlay has been brought into contact with the monomer. This can take place, for example, in a period of time between 1 second and 30 seconds, preferably in a period of time of less than 1 second. The selected temperature can be, for example, at least 10 K, preferably 20-40 K, above $T_M$. On the one hand, the polymerization of the monomer is then optimally accelerated, and, on the other hand, the monomer is not thermally degraded. The polymerization itself can last less than 30 seconds, or also between 30 seconds and 4 minutes.

However, the inlay can also be brought into contact with the monomer already in the heated state. The apparatus expenditure is then simpler at the price of heat no longer being able to be supplied during the polymerization. To have a reserve for unavoidable heat losses in this regard, the temperature of the inlay is advantageously increased to 30-50 K above $T_M$.

Since especially the strength of the contact surface between inlay and polymer is important for absorbing the shear force, in a particularly advantageous embodiment of the invention, the temperature $T_E$ of the inlay is kept at or above the temperature $T_M$ at least until the monomer is polymerized at least along its complete contact surface in relation to the inlay.

This has the further effect that the contact surface thereafter acts as a barrier both against the dissipation of heat into the inlay and also against the interaction of ions of the inlay with monomer molecules. If the barrier has been produced once, the increased temperature is no longer necessary to the previous extent. Therefore, the temperature $T_E$ of the inlay is advantageously lowered below the temperature $T_M$ after the monomer has been polymerized along its complete contact surface in relation to the inlay.

In this manner, in particular sensitive electronic components can be protected as inlays. The shorter the temperature strain, the higher the temperature can be.

In particular when feeding electric energy or electrical signals through an insulating carrier or an insulating housing, it is important that the connection is leak-tight, for example, to avoid short-circuits due to the penetration of moisture. In the case of implantable electronic medical devices, it is furthermore important that harmful materials do not escape into the body in conjunction with bodily fluids. Especially in the case of these applications, the inlay is at least partially electrically conducting or semiconducting.

If the inlay is at least partially electrically conducting or semiconducting, in one particularly advantageous embodiment of the invention, it can thus be resistively and/or inductively heated by application of a current. In this manner, especially the contact surface of the inlay in relation to the monomer, which is so important for the durably sealing connection, can be brought particularly rapidly to the temperature $T_M$ and likewise also cooled down again rapidly. The inlay can contain in particular copper, copper-tin alloys, tin, aluminum, iron, or an iron alloy. These metals have very different chemical potentials and thus also very different ionic activities. Notwithstanding this, the temperature increase to $T_M$ has the effect that the interfering interaction of these ionic activities with the monomer is suppressed.

In a further particularly advantageous embodiment of the invention, the inlay is immersed in the monomer, wherein at least one region on the surface of the inlay, which is not to be enclosed by the polymer, is covered by a deflector. The inlay can be immersed in the monomer in particular in the state heated to the temperature $T_M$. The monomer will then polymerize to form the polymer on the contact surface of the inlay in relation to the monomer everywhere it is not covered by the deflector. The inlay is therefore coated with a layer made of the polymer there, wherein the layer thickness is dependent on the temperature of the inlay and on the immersion time. The inlay can be immersed multiple times in particular. The inlay can also be heated further after the withdrawal from the bath having the monomer to complete the polymerization.

To assist the adhesion of the polymer, the inlay can advantageously be structured, in particular using undercuts. If the monomer penetrates into these undercuts and is subsequently polymerized, a form-fitting connection of the polymer to the inlay forms.

The invention also relates to various methods for the sealing integration of an inlay into a component, which are each improved in relation to the prior art in that the above-described method for producing a connection between the inlay and a polymer is applied at at least one specific point.

A first method for the sealing integration of an inlay into a component is distinguished in that the inlay is enclosed by a polymer in accordance with the above-described method and is subsequently injected into the component. The injection of an element into a component is known in manufacturing technology as "stitching" and can also be carried on in unchanged form. The inlay is merely enclosed by the polymer before the injection and thus upgraded to a semi-finished product.

The sealing effect between the inlay and the component can already be produced, for example, in that the polymer is deformed during the injection by the kinetics and/or by elastic tensions. The sealing effect can also be assisted, for example, in that the polymer is subsequently partially melted and in this manner is connected in a sealing manner to the component, such as for example, by laser beam welding.

The connection of the inlay to the polymer can also, however, enhance the reproducibility of the injection independently of the sealing effect. For this purpose, the component can advantageously be provided with a defined stop for the polymer. Independently of which deformation forces act between the inlay and the component, the inlay then always penetrates to the same depth into the component.

In a second method for the sealing integration of an inlay into a component, the inlay is introduced into a casting mold for the production of the component and, by way of a combination of extrusion coating using a plastic and enclosing using a polymer according to the method described at the outset, is connected in a sealing manner to the component resulting from the plastic. In this case, various embodiments are possible with respect to the sequence in which these steps take place. The extrusion coating can be carried out in particular by injection molding in an injection mold. In this case, the plastic can also be materially identical to the polymer.

As described at the outset, the inlay can be enclosed by the polymer before the introduction into the casting mold. If the inlay upgraded in this manner subsequently comes into contact with hot plastic during the extrusion coating, the polymer is partially melted. In conjunction with the plastic, after the solidification, the melt forms a durably sealing connection in relation to the component resulting from the plastic. The plastic advantageously has a somewhat higher melting point than the polymer by which the inlay is enclosed.

However, the inlay can alternatively also solely be enclosed by the still unpolymerized monomer before the introduction into the casting mold. In this embodiment of the method, the temperature of the inlay is increased at least to $T_M$ during or after the supply of the plastic for the extrusion coating to polymerize the monomer to form the polymer. In this case in particular, the temperature of the plastic can be used as a heat source for the heating of the inlay. In this case, depending on the type of the plastic from which the component is to be manufactured, the temperature required for the casting, in particular for the injection molding, can even be sufficiently high that it is advantageous or even required for the inlay to be cooled at the same time, so that neither the inlay nor the monomer is overheated.

In a third method for the sealing integration of an inlay into a component, the inlay is joined together with the component and is subsequently connected to a polymer according to the method described at the outset. The component can be manufactured in a known manner, for example, by injection molding or also by 3D printing. The joining together of the inlay with the component can also take place in a known manner, for example, by injection ("stitching"). The novelty is that the inlay is brought into contact with the monomer and this monomer is subsequently polymerized as described at the outset to produce the sealing connection. The expenditure for refitting existing facilities is minimized in this manner.

In a particularly advantageous embodiment of this method, the monomer is brought into contact with the inlay via a channel extending through the interior of the component. This channel can in particular already be provided during the production of the component. In this manner, the refitting to the method according to the invention can be substantially displaced into the component itself.

The joining together of the inlay with the component does not presume that the component is already completely finished at this point in time. The inlay can also already be joined together with the component during the production of the component.

For example, in a particularly advantageous embodiment of the method, the component is constructed by 3D printing around the inlay. In this case, a space for accommodating the monomer is left free around the inlay, and the monomer is introduced into this space. It is then left open in principle as to whether the monomer is brought into contact with the inlay only after ending the 3D printing or whether, for example, the 3D printing of the component is continued during the polymerization of the monomer to form the polymer.

The invention also relates to a device for carrying out the method for connecting the inlay to the polymer. This device comprises a conveyor for a stamped grating, in which a plurality of inlays can be supplied, and an at least two-part mold, which is closable around a single inlay and has a supply for the monomer into the space between the mold and the inlay. According to the invention, a power supply is provided for the resistive and/or inductive heating of the inlay enclosed by the mold.

In this manner, merely by adding the power supply, it is possible to cause the polymer resulting due to conversion of the monomer to be able to be connected significantly more strongly, in particular to metallic inlays, than heretofore possible.

The power supply especially for the inductive heating can take place in particular without direct contact. It can include, for example, at least one coil.

Further measures improving the invention are described in greater detail hereafter together with the description of the preferred exemplary embodiments of the invention on the basis of figures.

DETAILED DESCRIPTION

Figure 1A:
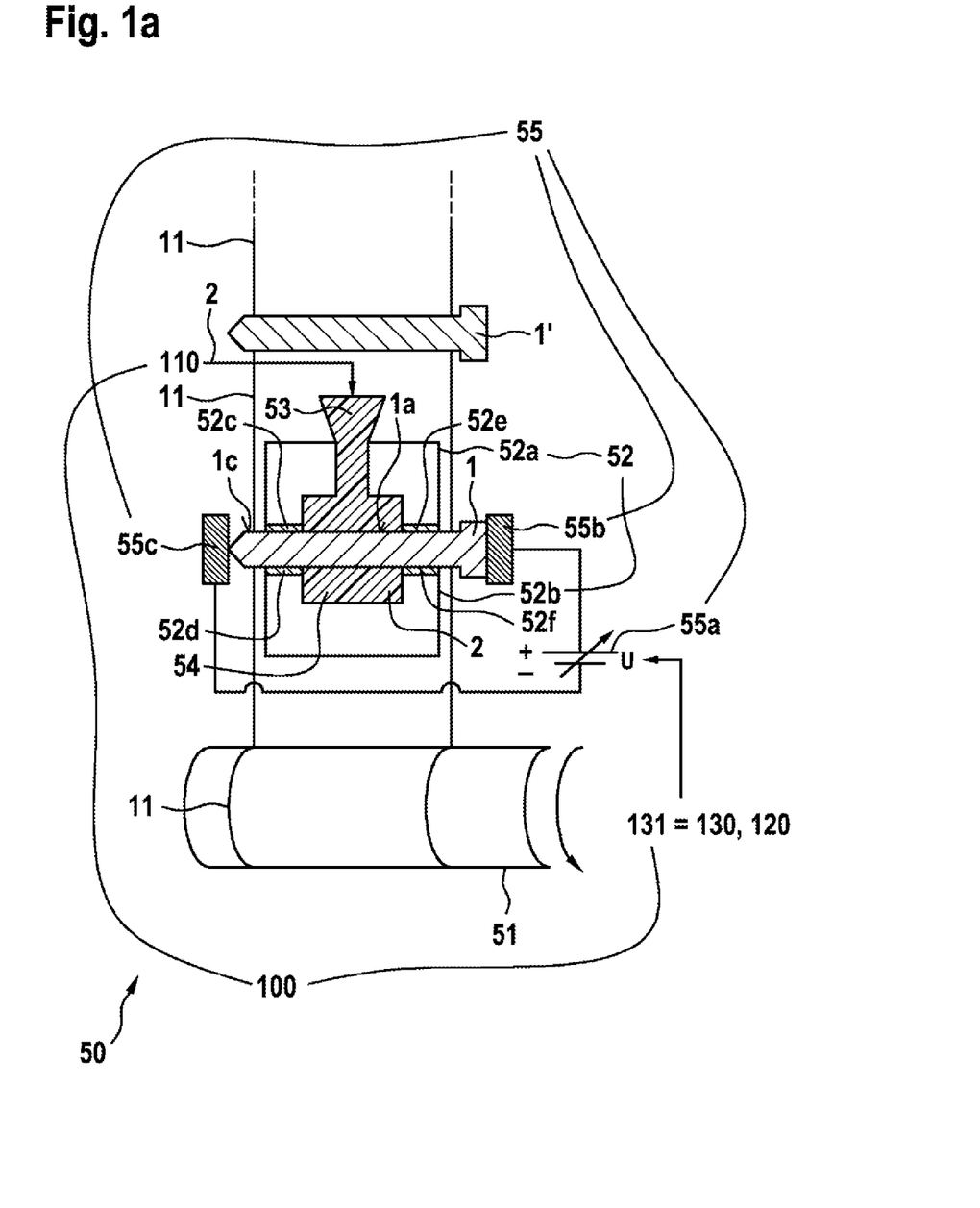
FIGS. 1a, 1b and 1c show an exemplary embodiment of the method 100 and a device 50 for carrying it out.

According to FIG. 1a, the device 50 for carrying out the method 100 comprises a conveyor 51, which conveys a stamped grating 11 having a plurality of inlays 1, 1', 1", formed here as metallic pins, from top to bottom and winds up the grating after delivery of the inlays 51. In FIG. 1a, an inlay 1, which is processed in the present work cycle of the device 50, and a further inlay 1', the processing of which is upcoming in the next work cycle of the device 50, are shown.

The inlay 1 is introduced into the mold 52, which consists of two parts 52a and 52b. When the two parts 52a and 52b of the mold 52 are closed around the inlay, a space 54 forms between them for accommodating the monomer 2. This space 54 extends peripherally around the inlay 1 and at the same time defines the part 1a of the surface 1c of the inlay 1 which forms the contact surface with the monomer 2. On the left of the space 54, the inlay 1 is clamped between the jaw 52c associated with the part 52a of the mold 52 and the jaw 52d associated with the part 52b of the mold 52. On the right of the space 54, the inlay 1 is clamped between the jaw 52e associated with the part 52a of the mold 52 and the jaw 52f associated with the part 52b of the mold 52.

In this position, the inlay 1 has contact with the electrodes 55b and 55c, which form the power supply 55 together with a controllable voltage source 55a. Instead of the electrodes 55b and 55c, an inductive power supply 55 can also be used.

After the monomer 2 has been supplied through the supply 53 in step 110 of the method 100, the inlay 1 is resistively heated by applying a suitable voltage U in step 131. The temperature $T_E$ of the inlay 1 is increased above $T_M$ and step 130 of the method 100 is thus executed. In this way, this in turn has the effect that the monomer 2 polymerizes to form the polymer 3 in step 120 of the method 100.

Figure 1B:
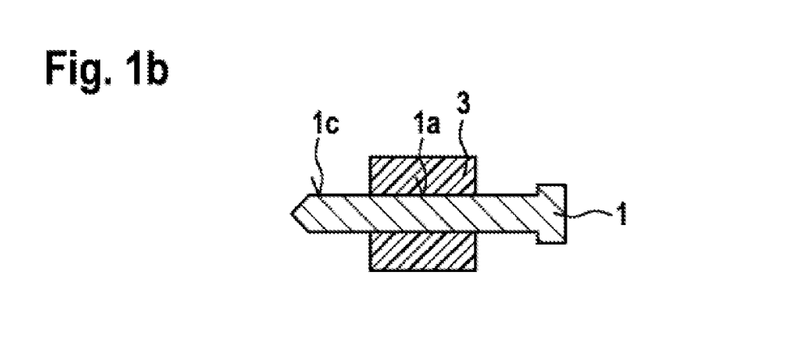

FIG. 1b shows the resulting product. Along the contact surface 1a, which forms a part of the surface 1c of the inlay 1, the inlay 1 is fixedly connected to the polymer 3 resulting from the monomer 2.

Figure 1C:
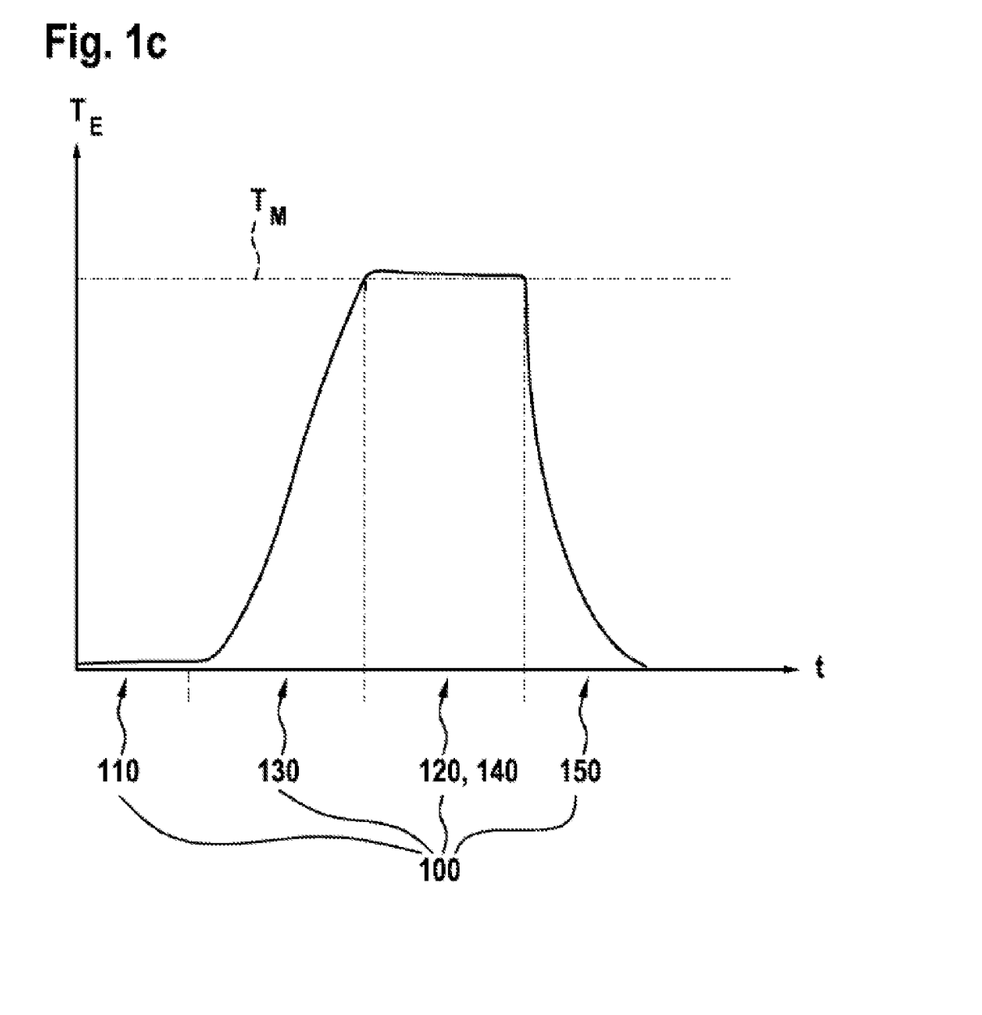

FIG. 1c shows an exemplary curve of the temperature $T_E$ of the inlay 1 over the time t. While the monomer 2 is supplied in step 110 of the method 100, $T_E$ corresponds to the ambient temperature. In step 130, the temperature $T_E$ is increased above $T_M$. While the temperature $T_E$ is above $T_M$, the polymerization 120 takes place. According to step 140, the temperature $T_E$ is kept at this level in this exemplary embodiment of the method 100 until the monomer 2 is completely polymerized to form the polymer 3. Subsequently, the temperature $T_E$ is returned back once more to ambient temperature in step 150.

If the thermal stress is to be minimized for the inlay 1, alternatively the temperature can already be reduced according to step 150 when the monomer 2 is not yet completely polymerized, but rather the resulting polymer 3 just completely covers the contact surface 1a in relation to the inlay 1 for the first time. The temperature $T_E$ is then not reduced down to ambient temperature, but rather to the temperature which is necessary to complete the polymerization 120.

Figure 2A:
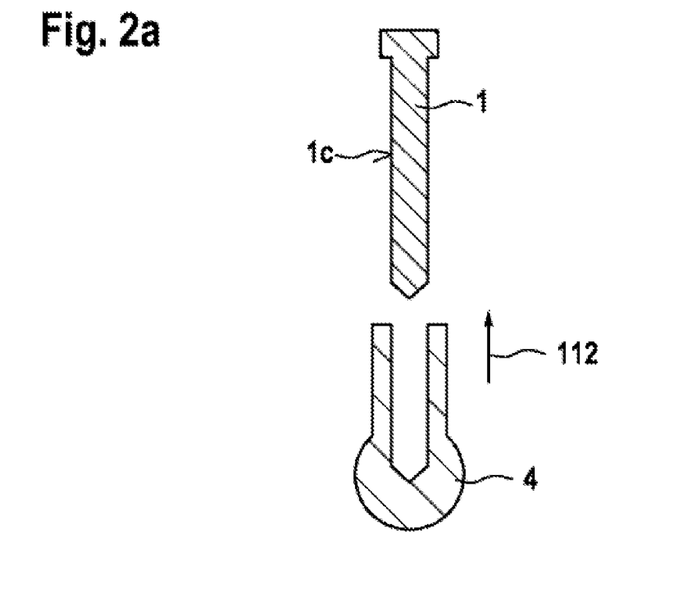
FIGS. 2a, 2b and 2c show an exemplary embodiment of the method 100 with cover 112 of a region 1b on the inlay 1 by a deflector 4.
Figure 2B:
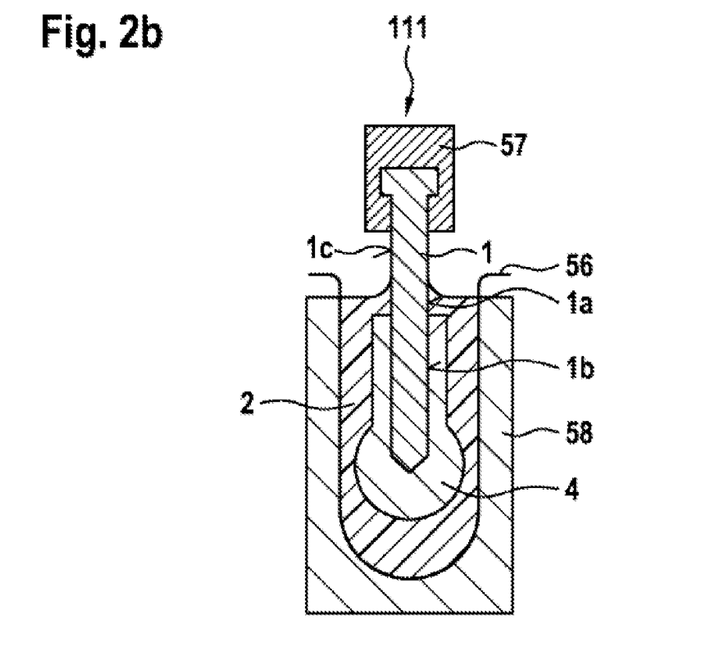

FIG. 2 shows a further exemplary embodiment of the method 100. According to FIG. 2a, a deflector 4 is firstly placed on the inlay 1 in step 112. When the inlay 1 is subsequently immersed using the heatable gripper 57 in the bath 56, which can be temperature-controlled by the heater 58, having the monomer 2 according to FIG. 2b (step 111), a part 1b of the surface 1c of the inlay 1 is protected from coming into contact with the monomer 2.

Figure 2C:
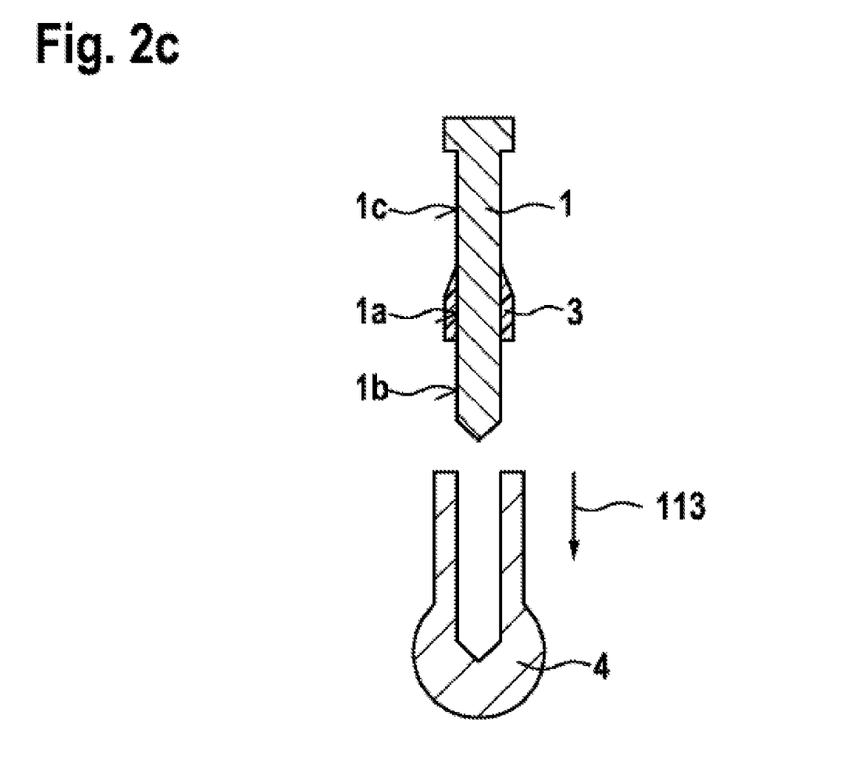

On the contact surface 1a between the monomer 2 and the inlay 1, the monomer 2 polymerizes to form the polymer 3 and forms a fixed coating there. By pulling off the deflector 4 in step 113, the covered region 1b is exposed again. The inlay 1 prepared in this manner can be electrically contacted in each case above and below the region 1a coated with the polymer 3 and can thus be used, for example, as an electrical feedthrough, which is sealed by the polymer 3.

Figure 3A:
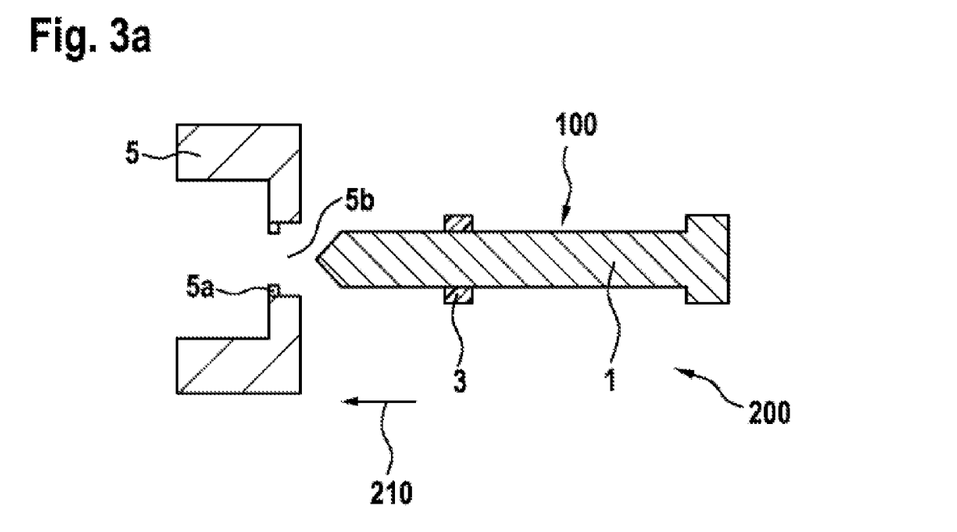
FIGS. 3a and 3b show an exemplary embodiment of the method 200 having injection 210 of the inlay 1.

FIG. 3a schematically illustrates an exemplary embodiment of the method 200 for the sealing integration of the inlay 1 into a component 5. The component 5 has a prepared opening 5b for the inlay 1, which is delimited by a stop 5a. The inlay 1 is firstly connected to the polymer 3 according to the described method 100 and subsequently injected into the opening 5b in step 210 of the method 200.

Figure 3B:
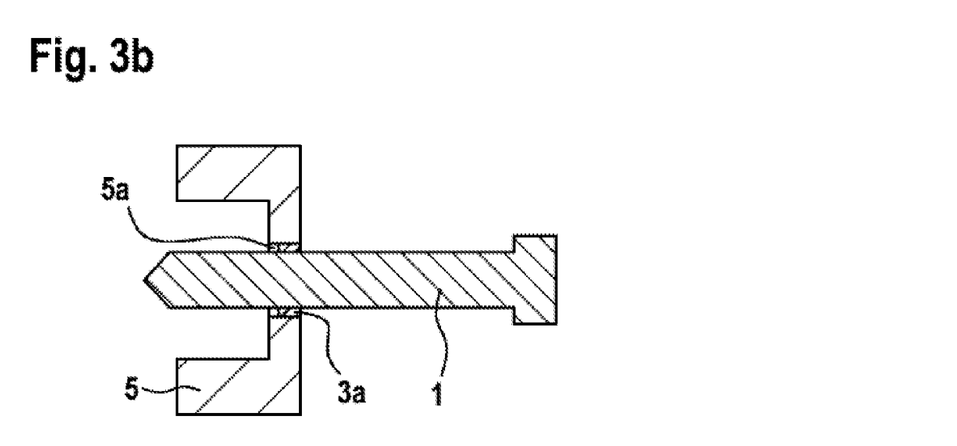

FIG. 3b shows the resulting product. Upon encountering the stop 5a in the opening 5b of the component 5, the polymer 3 has deformed to form a seal 3a, which seals the inlay 1 in relation to the component 5. The inlay 1 can thus be used, for example, as an electrical feedthrough through the component 5.

Figure 4A:
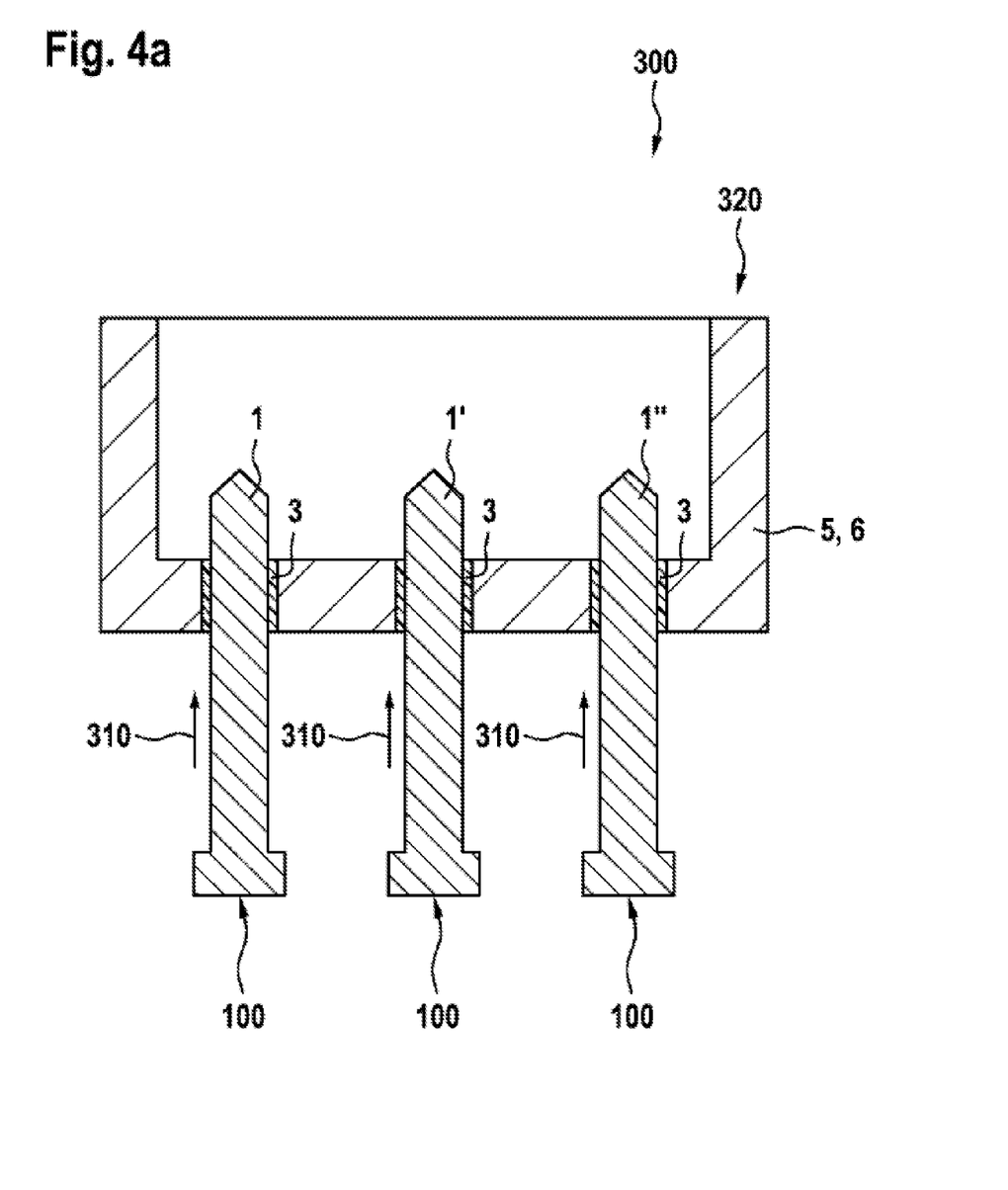
FIGS. 4a and 4b show a combination of the method 100 having injection molding in the method 300.
Figure 4B:
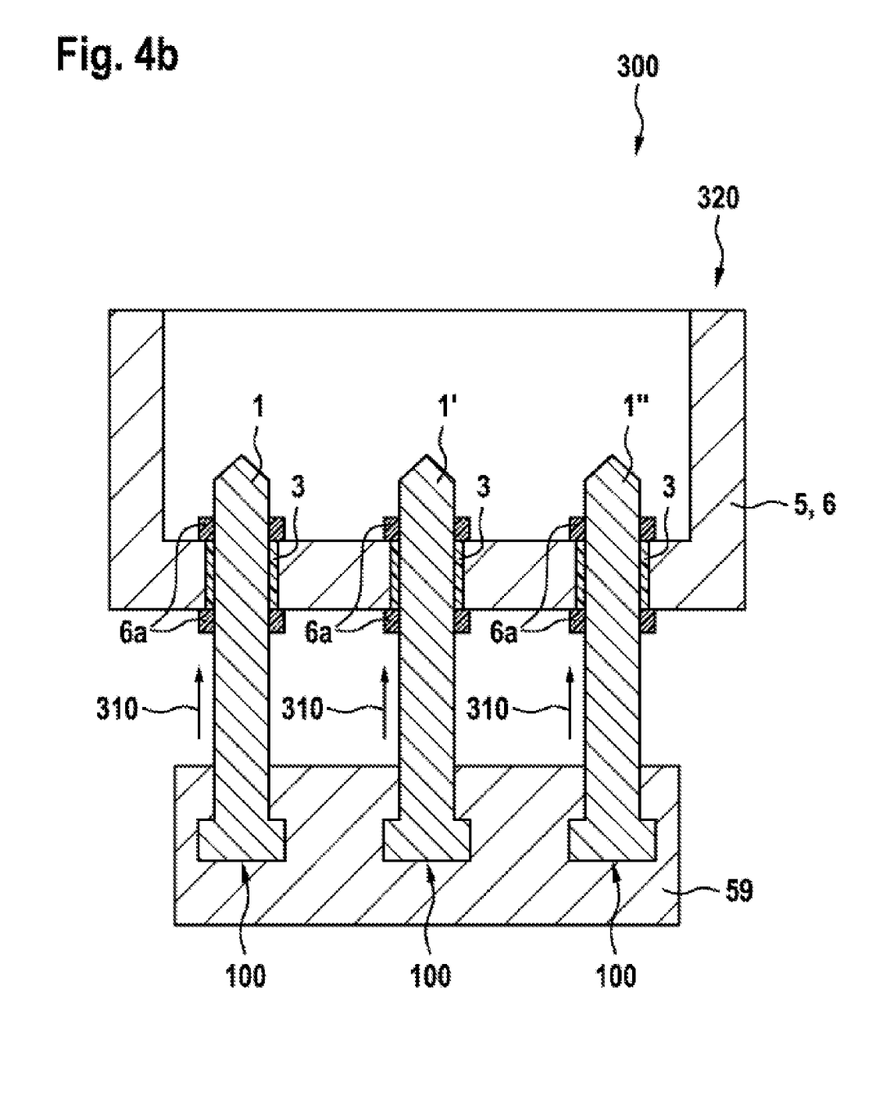

FIG. 4 illustrates an exemplary embodiment of the method 300, in which the method 100 for connecting three inlays 1, 1', and 1" to the polymer 3 is combined with injection molding. FIG. 4 shows, for the sake of comprehensibility, the state after the solidification of the plastic 6, which forms the component 5, and removal of the injection mold.

FIG. 4a shows a first variant. In this variant, in step 310 of the method 300, firstly the inlays 1, 1', and 1", each connected to the polymer 3 according to the method 100, were introduced into the casting mold for the component 5. Subsequently, in step 320 of the method 300, the plastic 6 was introduced into the casting mold. Upon solidification of the plastic 6, the component 5 resulted, which encloses in a sealing manner the polymer 3 connected to each of the inlays 1, 1', and 1". In this case, the sealing effect was reinforced in that the polymer 3 was melted on its surface in each case.

FIG. 4b shows a second variant. In this variant the inlays 1, 1', and 1" were introduced in the state in which they were only coated with monomer 2. The inlays were kept at a temperature between 0 and 50° C. using a cooling 59, to prevent the monomer already melting upon the introduction into the casting mold due to the temperature of the casting mold of approximately 80° C.

In this variant, the introduction of heat by the hot plastic 6 has also effectuated the polymerization of the monomer 2 to form the polymer 3 visible in FIG. 4b. In order that the monomer 2 was enclosed on all sides either by the inlay 1, 1', 1" or by the hot plastic 6 and was thus converted everywhere to form the polymer 3, the casting mold was modified in such a way that plastic 6 is also located at the points indicated by 6a in FIG. 4b.

The cooling 59 is very dynamic. Immediately after the pouring in of the hot plastic 6, the temperature $T_E$ of the inlays 1, 1', 1" reaches approximately 30-50 K above $T_M$. The polymerization of the monomer 2 to form the polymer 3 only during the production of the component 5 by injection molding has the advantage of a still better seal.

Figure 5:
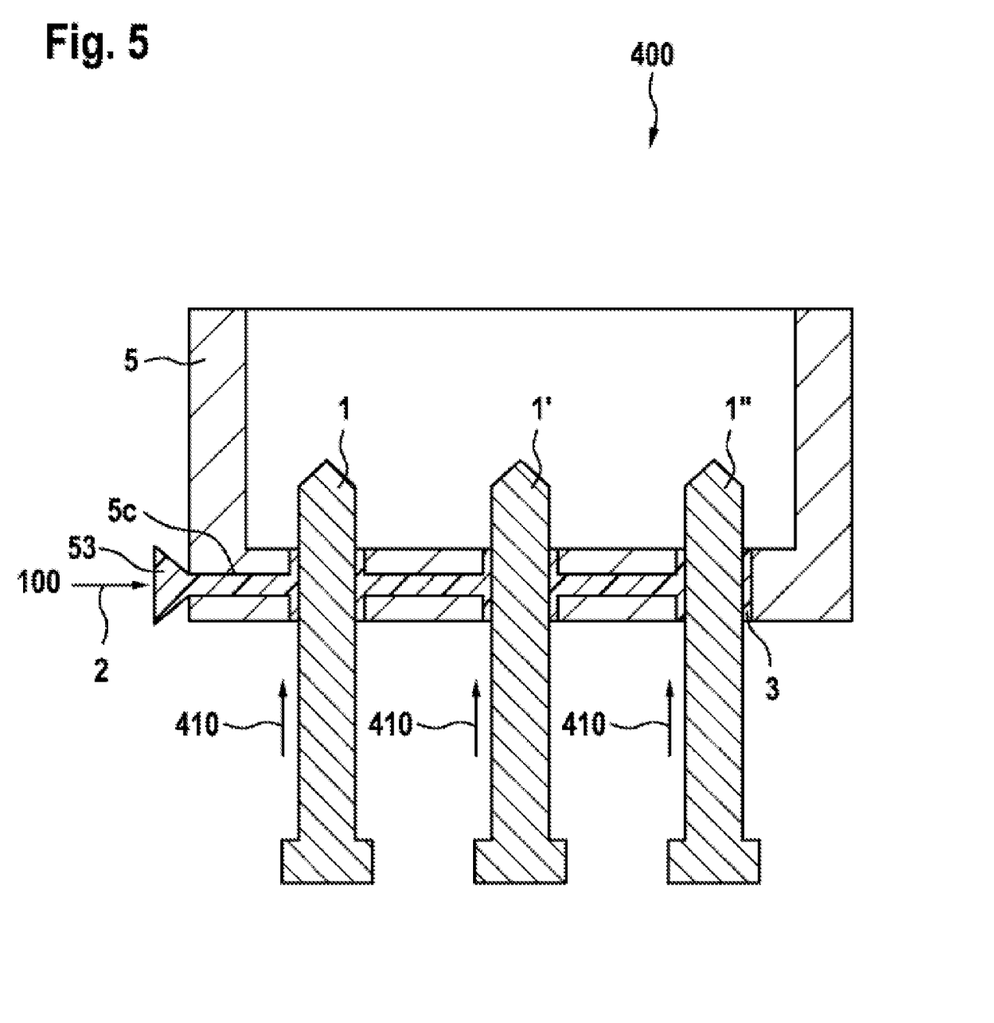
FIG. 5 shows an exemplary embodiment of the method 400 using a component 5 having channel 5c for the monomer 2.

FIG. 5 shows an exemplary embodiment of the method 400, in which three inlays 1, 1', 1" are first joined together with an injection-molded component 5 in step 410 and are subsequently connected to the polymer 3 by the method 100. FIG. 5 shows a snapshot of the point in time at which the monomer 2 is introduced via a supply 53 into the channel 5c. The polymerization can subsequently be started via means (not shown in FIG. 5) for increasing the temperature $T_E$ of the inlays 1, 1', 1".

Figure 6A:
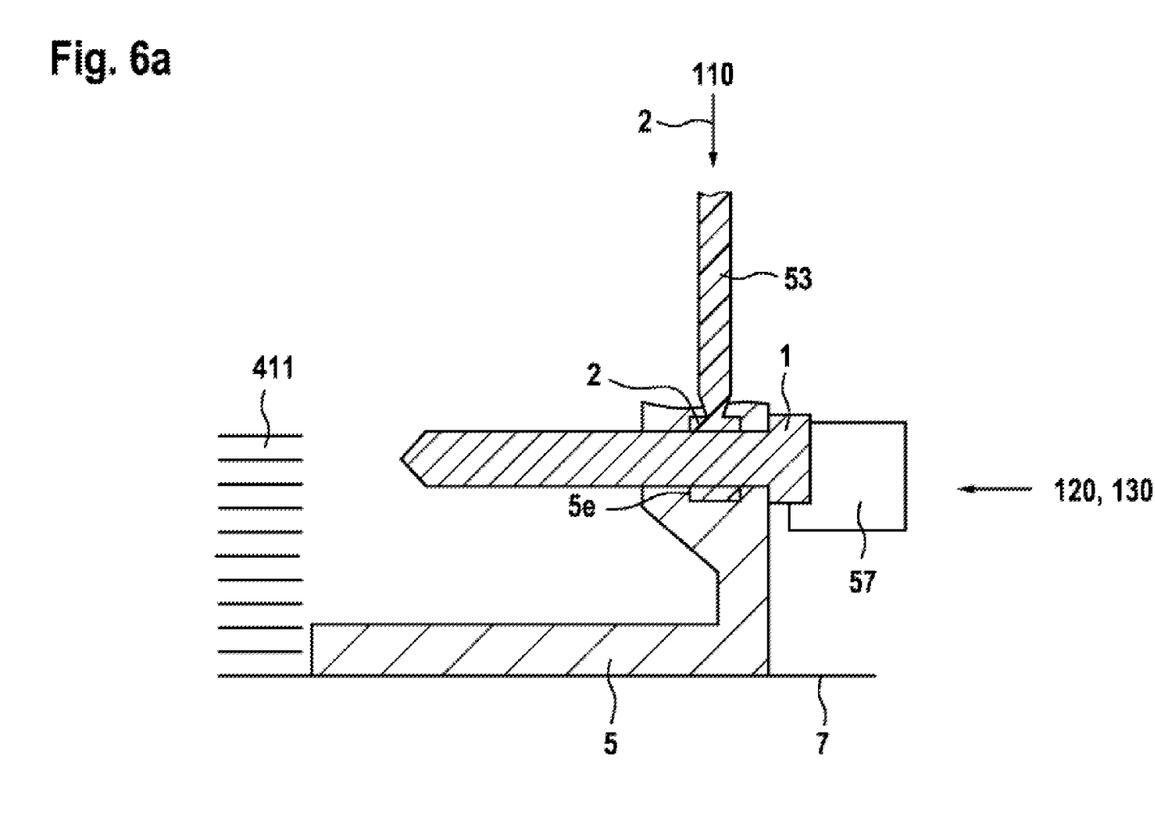
FIGS. 6a and 6b show a modification of the method 400 shown in FIG. 5 having 3D printing 411 of the component 5.
Figure 6B:
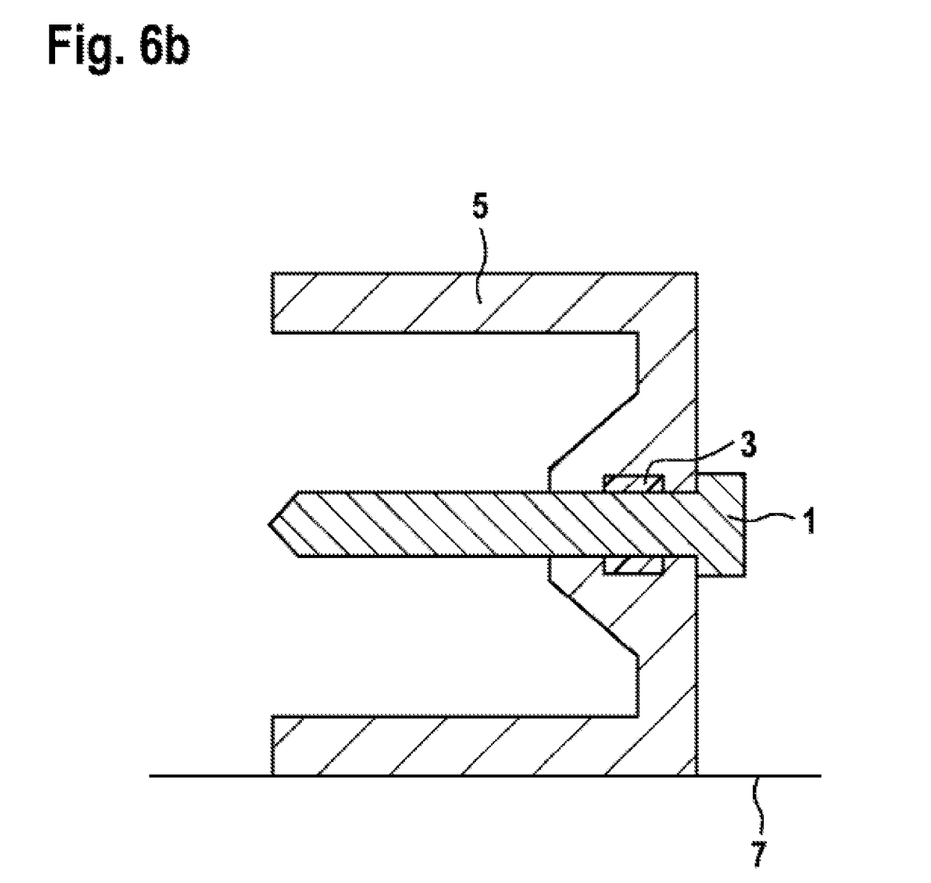

FIG. 6 shows a modification of the method 400. In contrast to FIG. 5, the component 5 is produced by layer-by-layer buildup 411 by means of 3D printing on a baseplate 7. A space 5e for the accommodation of the monomer 2 is left free in the component 5 in this case. The inlay 1 is added at a suitable point in time by means of a heatable gripper 57 and subsequently the material of the component 5 is printed around it. Before the space 5e is completely closed, the monomer 2 is introduced into the space 5e via the supply 53.

FIG. 6a shows a snapshot at a point in time at which the supply 110 of the monomer 2 has just started. At a suitable point in time, by increasing 130 the temperature $T_E$ of the inlay 1 at least to $T_M$, the polymerization 120 of the monomer 2 to form the polymer 3 can then be started. The 3D printing 411 of the component 5 can be continued while the polymerization 120 is still taking place.

FIG. 6b shows the resulting final product. The inlay 1 is enclosed by a peripheral ring made of the polymer 3, which is durably sealed in relation to the inlay 1. By the material of the component 5 having in turn been printed around the polymer 3, it is in turn also durably sealed in relation to the component 5. The inlay 1 is therefore overall guided permanently sealed through the wall of the component 5.

Figure 7:
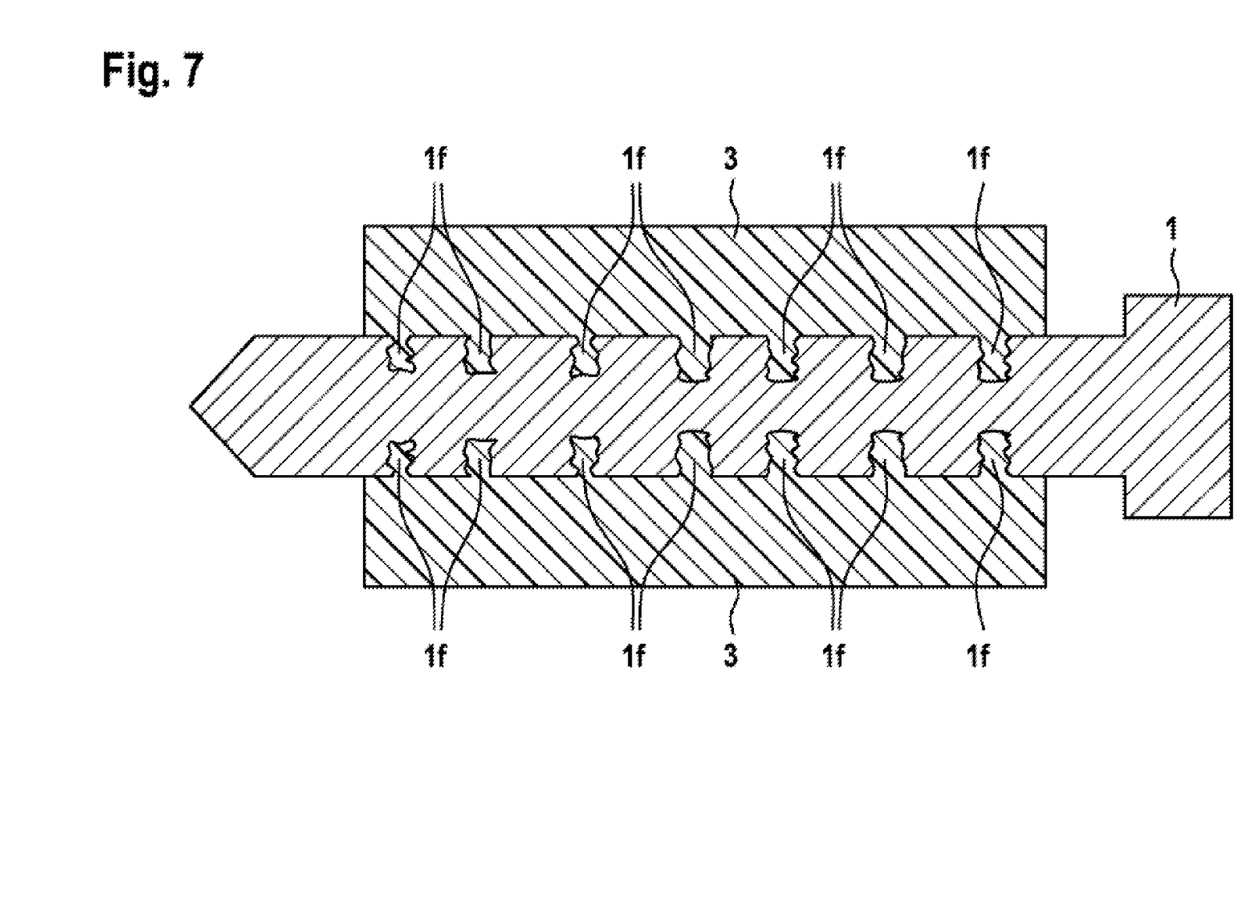
FIG. 7 shows introduction of structures 1f into the inlay 1 for producing a form-fitting connection to the polymer 3.

FIG. 7 schematically shows how the inlay 1 can be provided with structures 1f to improve the adhesion of the polymer 3. The thickness of the polymer 3 and the size of the structures 1f are shown greatly exaggerated. The polymer 3 engages into the structures 1f in such a way that a form-fitting connection is produced. The polymer 3 thus can no longer be stripped off from the inlay 1.

The invention claimed is:

1. A method (100) for producing a connection between an insert (1, 1', 1") and a polymer (3) at least partially enclosing the insert, wherein the insert (1, 1', 1") is at least partially electrically conducting or semiconducting, and wherein the insert has a temperature TE, the method comprising:
   bringing a monomer (2) into contact (110) with the insert (1, 1', 1"); and
   subsequently polymerizing (120) the monomer (2) to form the polymer (3), including at least temporarily increasing (130) the temperature TE of the insert (1, 1', 1") at least to a temperature $T_{Max}$, wherein the temperature $T_{Max}$ is the maximum temperature the monomer (2) assumes during exothermic polymerization (120) to form the polymer (3), and
   wherein the at least temporarily increasing (130) the temperature TE of the insert (1, 1', 1") at least to the temperature $T_{Max}$ comprises resistively and/or inductively heating (131) the insert (1, 1', 1") by application of a current I.

2. The method (100) as claimed in claim 1, characterized in that the temperature $T_E$ of the insert (1, 1', 1") is kept (140) at or above the temperature $T_{Max}$ at least until the monomer (2) is polymerized (120) at least along a complete contact surface (la) in relation to the insert (1, 1', 1").

3. The method (100) as claimed in claim 2, characterized in that the temperature $T_E$ of the insert (1, 1', 1") is lowered (150) below the temperature $T_{Max}$ after the monomer (2) has been polymerized (120) along the complete contact surface (la) in relation to the insert (1, 1', 1").

4. The method (100) as claimed in claim 1, characterized in that the insert (1, 1', 1") is immersed (111) in the monomer (2), wherein at least one region (1b) on a surface (1c) of the insert (1, 1', 1"), which is not to be enclosed by the polymer (3), is covered (112) by a deflector (4).

5. The method (100) as claimed in claim 1, characterized in that the insert (1, 1', 1") is provided with structures (1f), which, after introduction of the monomer (2) and polymerization (120) of the monomer (2) to form the polymer (3), establish a form-fitting connection between the insert (1, 1', 1") and the polymer (3).

6. A method (200) for producing a sealing integration of an insert (1, 1', 1") into a component (5), the method comprising:
enclosing the insert (1, 1', 1") with a polymer (3) according to the method as claimed in claim 1; and
subsequently inserting (210) the insert (1, 1', 1") into the component (5).

7. A method (300) for producing a sealing integration of an insert (1, 1', 1") into a component (5), the method comprising:
introducing (310) the insert (1, 1', 1") into a casting mold for production of the component (5);
overmolding (320) the insert (1, 1', 1") with a plastic (6); and
enclosing (100) the insert (1, 1', 1") with a polymer (3) as claimed in claim 1,
wherein the component (5) is formed from the plastic (6) and the insert (1, 1', 1") is connected to the component (5) in a sealing manner.

8. The method (300) as claimed in claim 7, characterized in that the insert (1, 1', 1") is enclosed (100) by the polymer (3) before introduction (310) into the casting mold and the polymer (3) is partially melted (330) by contact with the plastic during the overmolding (320).

9. The method (300) as claimed in claim 7, characterized in that the insert (1, 1', 1") is enclosed (110) by the monomer (2) before introduction (310) into the casting mold and the temperature of the insert (1, 1', 1") is increased at least to $T_{Max}$ during or after supply (320) of the plastic (6) to polymerize (120) the monomer (2) to form the polymer (3).

10. A method (400) for producing a sealing integration of an insert (1, 1', 1") into a component (5), the method comprising:
joining the insert (1, 1', 1") together (410) with the component (5); and
subsequently connecting (100) the insert (1, 1', 1") to a polymer (3) according to the method as claimed in claim 1.

11. The method (400) as claimed in claim 10, characterized in that the monomer (2) is brought into contact (110) with the insert via a channel (5c) extending through an interior of the component (5).

12. The method (400) as claimed in claim 10, characterized in that the component (5) is constructed (411) by 3D printing around the insert (1, 1', 1"), wherein a space (5e) for accommodating the monomer (2) is left free around the insert (1, 1', 1"), and wherein the monomer (2) is introduced (110) into the space.

13. A method (100) for producing a connection between an insert (1, 1', 1") and a polymer (3) at least partially enclosing the insert, wherein the insert (1, 1', 1") is at least partially electrically conducting or semiconducting, and wherein the insert has a temperature $T_E$, the method comprising:
bringing a monomer (2) into contact (110) with the insert (1, 1', 1"); and
subsequently polymerizing (120) the monomer (2) to form the polymer (3), including at least temporarily increasing (130) the temperature $T_E$ of the insert (1, 1', 1") at least to a temperature that ensures that heat flow always runs from the insert (1, 1', 1") to the monomer (2), and
wherein the at least temporarily increasing (130) the temperature $T_E$ of the insert (1, 1', 1") comprises resistively and/or inductively heating (131) the insert (1, 1', 1") by application of a current I.

14. The method (100) as claimed in claim 1, wherein increasing (130) the temperature $T_E$ of the insert (1, 1', 1") at least to the temperature $T_{Max}$ ensures that heat flow always runs from the insert (1, 1', 1") to the monomer (2).

15. The method (100) as claimed in claim 1, wherein the method (100) produces an electronic component embedded in a plastic carrier or housed in a plastic housing, and wherein the insert (1, 1', 1") at least partially enclosed by the polymer (3) is a metallic electrical feedthrough sealed by a plastic carrier or plastic housing.

16. The method (100) as claimed in claim 15, wherein the electronic component is selected from a conductor track, a sensor, and a printed circuit board.

17. The method (100) as claimed in claim 13, wherein the method (100) produces an electronic component embedded in a plastic carrier or housed in a plastic housing, and wherein the insert (1, 1', 1") at least partially enclosed by the polymer (3) is a metallic electrical feedthrough sealed by a plastic carrier or plastic housing.

18. The method (100) as claimed in claim 17, wherein the electronic component is selected from a conductor track, a sensor, and a printed circuit board.

\* \* \* \* \*